(12) United States Patent
El Ayi

(10) Patent No.: US 10,479,700 B2
(45) Date of Patent: Nov. 19, 2019

(54) SYSTEM AND METHOD OF DESALINATION

(71) Applicant: Alain El Ayi, Paris (FR)

(72) Inventor: Alain El Ayi, Paris (FR)

( * ) Notice: Subject to any disclaimer, the term of this patent is extended or adjusted under 35 U.S.C. 154(b) by 436 days.

(21) Appl. No.: 15/306,196

(22) PCT Filed: Apr. 25, 2014

(86) PCT No.: PCT/IB2014/000632
§ 371 (c)(1),
(2) Date: Oct. 24, 2016

(87) PCT Pub. No.: WO2015/162446
PCT Pub. Date: Oct. 29, 2015

(65) Prior Publication Data
US 2017/0174532 A1 Jun. 22, 2017

(51) Int. Cl.
| | | |
|---|---|---|
| *C02F 1/06* | (2006.01) | |
| *C02F 1/04* | (2006.01) | |
| *C02F 1/16* | (2006.01) | |
| *B01D 3/10* | (2006.01) | |
| *B01D 5/00* | (2006.01) | |
| *B01D 3/06* | (2006.01) | |
| *B01D 3/42* | (2006.01) | |
| *C02F 1/00* | (2006.01) | |
| *C02F 103/08* | (2006.01) | |

(52) U.S. Cl.
CPC ............... *C02F 1/06* (2013.01); *B01D 3/06* (2013.01); *B01D 3/103* (2013.01); *B01D 3/42* (2013.01); *B01D 5/0048* (2013.01); *C02F 1/008* (2013.01); *C02F 1/04* (2013.01); *C02F 1/046* (2013.01); *C02F 1/16* (2013.01); *C02F 2103/08* (2013.01); *Y02A 20/128* (2018.01)

(58) Field of Classification Search
None
See application file for complete search history.

(56) References Cited

U.S. PATENT DOCUMENTS

| | | |
|---|---|---|
| 3,194,747 A | 7/1965 | Ris et al. |
| 5,064,505 A | 11/1991 | Borgren |
| 6,440,275 B1 | 8/2002 | Domen |
| 2004/0055866 A1 | 3/2004 | Levine |
| 2008/0173590 A1 | 7/2008 | Duesel et al. |

FOREIGN PATENT DOCUMENTS

| | | |
|---|---|---|
| CN | 101648729 A | 2/2010 |
| FR | 2493171 A1 | 5/1982 |
| FR | 2754530 A1 | 4/1998 |
| JP | S4321852 Y1 | 9/1968 |
| JP | S5626579 A | 3/1981 |
| JP | 2002239536 A | 8/2002 |
| JP | 2013043124 A | 3/2013 |
| WO | 98/16474 A1 | 4/1998 |
| WO | WO9816474 A1 | 4/1998 |
| WO | 2004014802 A1 | 2/2004 |
| WO | WO2004014802 A1 | 2/2004 |
| WO | 2004069370 A1 | 8/2004 |
| WO | 2005007580 A1 | 1/2005 |
| WO | WO2005007580 A1 | 1/2005 |
| WO | 2010017682 A1 | 2/2010 |
| WO | WO2010017682 A1 | 2/2010 |
| WO | 2012002923 A1 | 1/2012 |
| WO | WO2012002923 A1 | 1/2012 |
| WO | 2012085326 A1 | 6/2012 |

OTHER PUBLICATIONS

International Search Report in PCT/IB2014/000632, dated Dec. 22, 2014, 4 pages (French), with attached English translation, 3 pages.
International Preliminary Report on Patentability in PCT/IB2014/000632, dated Aug. 10, 2016, 10 pages (French), with attached English translation, 11 pages.
Written Opinion of the International Search Authority in PCT/IB2014/000632, dated Dec. 22, 2014, 7 pages (French), with attached English translation, 5 pages.

*Primary Examiner* — Renee Robinson
*Assistant Examiner* — Derek N Mueller
(74) *Attorney, Agent, or Firm* — Servilla Whitney LLC

(57) ABSTRACT

The present invention relates to a system and method using a reservoir specially designed for desalinating sea water. The invention makes it possible to evaporate the sea water and condense the resulting vapor at low pressure. Discharges into the sea resulting from said desalination operations have a low salt concentration. The present system and method can be used to recycle energy, even energy which is difficult to recycle, for desalinating sea water, or can be combined with other desalination techniques, for example such as MSF evaporation or MED distillation.

9 Claims, No Drawings

SYSTEM AND METHOD OF DESALINATION

CROSS REFERENCE TO RELATED APPLICATIONS

This is a National Phase entry of International Application No. PCT/IB2014/000632, filed Apr. 25, 2014, the disclosure of which is incorporated herein by reference in its entirety.

PRIOR ART

Systems and methods of desalination of sea water are well known, and indeed thousands of desalination plants which use them are in use worldwide. The principal systems and methods employed are the membrane type (basically, reverse osmosis, RO) and the evaporation type (basically, multistage flash evaporation (MSF) and multi-effect distillation (MED)). Other techniques exist which may or may not be related to these two systems and methods, such as electrical, chemical, freezing, or "renewable energy" techniques. The advantages of the system and method according to the present invention are compatible with most of these methods, but the present invention is different from the existing systems and methods.

DESCRIPTION OF THE INVENTION

The system and method according to the present invention are characterized by construction and utilization of a perfectly sealed reservoir. The walls, ceiling, and any supporting pillars of this reservoir must have the necessary strength to withstand the significant load placed on them. The reservoir must be located at the edge of the sea if the water to be desalinated is sea water. The materials of construction used must be compatible with sea water. The surface area of the base of the reservoir depends on the amount of desalinated water to be produced, and is limited only by civil engineering constraints. The reservoir communicates with the exterior in only two ways: (1) The first means of communication are via a device disposed on the roof, which allows the entire reservoir to be filled with sea water and which will then be closed so as to render the reservoir perfectly sealed. (2) The reservoir also communicates with the sea through one or more openings disposed below sea level. These openings must be hermetically sealed (by means of a control system) when filling the reservoir. After filling, they are gradually opened, placing the sea water which is inside the reservoir in communication with the water of the sea. One of the simple solutions for making the sea water of the reservoir communicate with the water of the sea is to place the base of the reservoir at a lower level than the sea level, during construction, and to place these openings on the face of the reservoir below sea level. The top part of the reservoir is above sea level.

It is now necessary to specify the height above sea level at which the ceiling of the reservoir will be disposed. The following example will facilitate the setting of this height: A reservoir of this type, with a height of 13 meters above sea level, is filled with sea water and is hermetically sealed. Then the opening (openings) of communication between the sea water of the reservoir and the water of the sea is progressively opened (are progressively opened). The water level in the reservoir will decrease and will stabilize at a height h above the level of the sea. Consider 3 points. The first point A is disposed in the sea at the level of the surface of the water. The second point B is disposed at the same level as A but in the interior of the reservoir. The third point C is disposed at the level of the surface of the water in the reservoir. Point A is in the open air, and thus is at atmospheric pressure, designated $P_a$. Given that the sea water exterior to the reservoir and the sea water in the reservoir are in communication, the pressure at point B, which is at the same level as point A, will be equal to the atmospheric pressure. Considering that, at the time that the water of the sea was placed in communication with the sea water of the reservoir, the reservoir was entirely filled, then the pressure that exists at point C is the pressure due to saturated vapor at the sea water temperature in the reservoir, designated $P_s$. By the fundamental principle of hydrostatics, the pressure difference between points B and C is $P_a - P_s = \rho g h$, where $\rho$ is the density of the sea water, h is the difference in level between point C and point B, and g is the local acceleration of gravity, which is approximately 9.8 m/sec/sec. It follows that $h = (P_a - P_s)/\rho g$ and that the value of h is on the order of 9.5 to 10 meters. It is obviously independent of the 13 m chosen for purposes of example, as shown in the above formula. The height of the ceiling of the reservoir above sea level should be equal to this height h plus the additional height allotted to the space necessary to treat the water vapor generated in the reservoir.

Then it is sufficient to use systems which are suitable for condensing this vapor to obtain desalinated water via a system comparable to the flash distillation system: condensation of the water vapor creates a pressure decrease and the removal of water from the surface of the reservoir toward the sea maintains the temperature of water at the surface of the reservoir at the temperature of the water of the sea. Thus the phenomenon of "flash evaporation" is maintained. The same result can be obtained by replacing the condensation operation by continuous removal of a portion of the vapor located above the sea water of the reservoir, with the evacuation of water from the surface of the reservoir remaining unchanged. The vapor removed will then be condensed outside the reservoir, to obtain desalinated water. The condensation rate of the vapor, or the removal rate of said vapor, creates a "non equilibrium allowance". This aim is to achieve a compromise between the amount of water to be desalinated and its quality (one should avoid draining saline water droplets along with the "distilled" water vapor). One tonne of water discharged from the surface of the reservoir liberates per degree of temperature decrease an energy of $$E = mC_p \Delta t,$$

where m is the weight of water removed (here 1000 kg), $C_p$ is the specific heat of the sea water removed, at constant pressure (it is equal to about 4.2 kilojoules per kilogram per degree centigrade), and $\Delta t$ is equal to the reduction of the temperature of the water removed (here $\Delta t$ is 1° centigrade). This energy loss depends on the salt concentration and temperature of the sea water, and is about 4.2 million joules in this case. The latent heat of vaporization of water at this temperature being equal to ca. 2.4 million joules, 4.2 million joules release about 1.75 kg of vapor. The exact values for $\rho$, $C_p$, and the latent heats of vaporization, as functions of various different parameters such as the temperature or the salt concentration of the sea water available to be treated, may be calculated or may be drawn from published tables.

Removal of one tonne of water from the surface of the reservoir toward the sea requires only a small amount of energy, because, in doing so, potential energy is transformed into pressure energy (which the water will have as it is returned to atmospheric pressure). It is only necessary to compensate for the frictional energy (due to the viscosity of the water) during its transfer from the level at the surface of the reservoir to the sea.

In order to limit the presence of droplets of sea water which may be entrained with the water vapor, one must limit the speed at which the water vapor is removed from the surface of the water in the reservoir. An acceptable value for this speed is in general a few meters per second. This result is obtained by limiting the pressure decrease due to condensation of the water vapor from the reservoir. Installation of a metal grid (Demister) will result in retention of droplets of saline water which may be entrained with the vapor. On the other hand, it should be noted that the increase in concentration of the salt content of the water removed from the reservoir towards the sea is very low compared to the increase experienced in the other systems and methods of desalination. The present method of desalination is very environmentally friendly.

The amount of water which is treated in a reservoir can be increased by adding one or more superposed basins of low height (ca. 40 cm), inside the reservoir, above the surface of the water in the reservoir and parallel to that surface. The sea water inside the reservoir, which is at the temperature of the water of the sea, is pumped into these basins. A condensation system in each basin condenses the water vapor. The water in these basins is continuously removed toward the sea. The stack of basins increases the amount of desalinated water in proportion to the number of levels, for the same footprint area of the reservoir. The water vapor can be removed in the same manner as in the previous case.

A second reservoir, which operates in the same manner as the first reservoir, may also be added. This second reservoir is fed with sea water supplied through pumps and pipes of sufficient size from the interior of the sea. The point of water intake inside the sea is at a depth Z below the sea level. The greater the depth of the point of water intake, the lower the temperature of the sea water is and the higher the pressure. Feeding the water to the reservoir does not require a great deal of energy because the pressure energy which decreases when the depth decreases is converted to potential energy. The energy consumed by the pumps serves to compensate for the energy lost by friction in the pipes because of the viscosity of the water.

Thus, two reservoirs are provided: the first reservoir, in which the temperature is that of the water of the sea located next to the reservoir, which water is used to feed said reservoir; and the second reservoir, in which the water is at a lower temperature. This temperature can be selected by setting the depth Z of the point of intake of the water. In this case, it is the cold water from the second reservoir which is used to condense the water vapor of the first reservoir. This can be done in several ways. The two reservoirs can be connected by leakproof pipes which will be utilized for condensation in schemes similar to those used in MSF or MED distillation. For example, if one injects cold water into the pipes which are disposed in the space containing the water vapor of the first reservoir, a portion of the vapor condenses and the water thus condensed can be passed into the reservoirs intended to collect it. The cold water from the second reservoir is discharged to the sea; during this operation, the temperature of this cold water has been increased.

The level of the sea facing the communication openings of the reservoir with the sea can be stabilized if large fluctuations in this level were to disturb the desalination operations. For this purpose, walls which provide closed containment spaces may be added in the sea, facing the communication openings between the reservoir and the sea. One may also add a sea water treatment system for treating the water which enters these containment spaces and comes to be fed to the reservoir(s); this treatment system may be installed in the described walls themselves.

The investment cost and the operating cost of sea water desalination using the present invention are significantly lower than those of all other methods used. There is virtually no maintenance for such a facility, but when maintenance is necessary it may be performed by underwater workers, in a manner such that operation of the facility is not interrupted, and in particular such that the reservoirs are not emptied and refilled

The invention claimed is:

1. A method of desalination of sea water, comprising:
   provision of a sealed reservoir disposed at the edge of the sea, comprising a filling device disposed on the roof, along with one or more openings disposed below sea level and being in communication with the sea;
   filling of the reservoir with sea water by the filling device, with the openings being hermetically sealed, followed by closing of the filling device to render the reservoir sealed;
   opening of the openings, placing the water which is inside the reservoir in communication with the water of the sea, wherewith the water level in the reservoir will decrease and will stabilize at a height h above the level of the sea, wherewith water vapor is produced in the reservoir above said height h, and wherewith the ceiling of the reservoir will have a height above the level of the sea greater than the height h to allow treatment of the water vapor produced in the reservoir;
   condensation of the water vapor produced, to obtain desalinated water; and
   removal of water from the water surface located at a height h in the reservoir toward the sea, in order to maintain the temperature of the water at the surface of the reservoir at the temperature of the water of the sea.

2. The method according to claim 1, wherein the base of the reservoir is disposed below the level of the sea, with the openings being disposed on the face of the reservoir facing the sea, below the level of the sea.

3. The method according to claim 1, wherein part of the water vapor is continuously removed from the reservoir, prior to being condensed outside the reservoir.

4. The method according to claim 1, wherein one or more superposed basins are provided in the interior of the reservoir, above the surface of the water in the reservoir and parallel to the surface of the water in the reservoir, wherewith the sea water from inside the reservoir is pumped into these basins, and the water in these basins is continuously removed toward the sea, wherewith the water vapor is condensed in each basin.

5. The method according to claim 1, wherein the reservoir is a first reservoir, and the method further comprises:
   feeding sea water to a second reservoir which functions in the same manner as the first reservoir, the feeding being by means of pumps and pipes, from an intake point of the water inside the sea at a depth Z below the sea level, with the temperature of the water in the second reservoir being lower than the temperature of the water in the first reservoir, wherewith the water in the second reservoir is used to condense the water vapor of the first reservoir, and wherewith the water from the second reservoir, which undergoes a temperature increase during the condensation, is removed to the sea;
wherein the water from the second reservoir is injected into pipes disposed in the space in which the water vapor of the first reservoir is disposed, so as to condense a part of the water vapor and to pass the water of condensation to reservoirs intended to collect that water.

6. The method according to claim 1, wherein the level of the sea facing the openings of the reservoir is stabilized by means of walls which provide closed containment spaces, and wherein a system of treatment is provided being disposed in the containment walls, for treating the water of the sea which enters into the containment spaces and is used to feed the reservoir.

7. The method according to claim 1, comprising recycling of energy provided by other facilities, with injection of heat into the reservoir via tubes traversing the reservoir, and distillation of the water of the reservoir which has been heated is accomplished via a system of successive basins equipped with condensers.

8. The method according to claim 1, further comprising multistage flash evaporation.

9. The method according to claim 1, further comprising desalination by means of multi-effect distillation.

\* \* \* \* \*